United States Patent
Lipinska-Kalita et al.

(10) Patent No.: US 8,663,429 B2
(45) Date of Patent: Mar. 4, 2014

(54) HOLLOW GLASS MICROSPHERE CANDIDATES FOR REVERSIBLE HYDROGEN STORAGE, PARTICULARLY FOR VEHICULAR APPLICATIONS

(76) Inventors: Kristina E. Lipinska-Kalita, Las Vegas, NV (US); Oliver Andreas Hemmers, Henderson, NV (US)

( * ) Notice: Subject to any disclaimer, the term of this patent is extended or adjusted under 35 U.S.C. 154(b) by 739 days.

(21) Appl. No.: 12/381,151

(22) Filed: Mar. 6, 2009

(65) Prior Publication Data
US 2009/0242382 A1 Oct. 1, 2009

Related U.S. Application Data

(60) Provisional application No. 61/068,341, filed on Mar. 6, 2008.

(51) Int. Cl.
*C01B 3/00* (2006.01)
*B65D 85/00* (2006.01)

(52) U.S. Cl.
USPC ....................... 204/157.52; 206/0.7

(58) Field of Classification Search
USPC ....................... 204/157.52; 206/0.7
See application file for complete search history.

(56) References Cited

U.S. PATENT DOCUMENTS

| | | | | |
|---|---|---|---|---|
| 3,365,315 | A * | 1/1968 | Beck et al. | 501/33 |
| 4,145,269 | A * | 3/1979 | Teitel | 204/157.52 |
| 4,211,537 | A * | 7/1980 | Teitel | 423/658.2 |
| 4,298,439 | A * | 11/1981 | Gafney | 204/157.52 |
| 4,302,217 | A * | 11/1981 | Teitel | 422/109 |
| 4,476,156 | A * | 10/1984 | Brinker et al. | 501/17 |
| 4,612,292 | A * | 9/1986 | Richard | 501/27 |
| 4,726,981 | A * | 2/1988 | Pierson et al. | 501/4 |
| 5,840,440 | A | 11/1998 | Ovshinsky et al. | |
| 6,106,801 | A | 8/2000 | Bogdanovic et al. | |
| 6,110,528 | A | 8/2000 | Kimura et al. | |
| 6,171,987 | B1 * | 1/2001 | Hormadaly | 501/26 |
| 6,231,642 | B1 | 5/2001 | Shelby et al. | |
| 6,849,334 | B2 * | 2/2005 | Horne et al. | 428/402 |
| 6,995,101 | B2 * | 2/2006 | Zou et al. | 501/46 |

(Continued)

FOREIGN PATENT DOCUMENTS

WO WO 2007142335 A1 * 12/2007 ............... C01B 3/02

OTHER PUBLICATIONS

Lewkowicz, "Spherical hydrogen targets for laser-produced fusion," J. Phys. D: Appl. Phys. vol. 7, 1974, pp. L61-L62.*

(Continued)

*Primary Examiner* — Keith Hendricks
*Assistant Examiner* — Colleen M Raphael
(74) *Attorney, Agent, or Firm* — Ballard Spahr LLP (57) ABSTRACT

A source of hydrogen is a glass or glass-ceramic shell and a gas comprising at least 80% by volume of hydrogen. The glass shell has an initial permeability to hydrogen gas of less than about 50% decrease in pressure in 30 days and a final permeability to hydrogen of about 50% decrease in pressure in a few minutes or less, upon exposure of the glass to a continuous or pulsed fluence of at least 0.1 W/cm$^2$ of electromagnetic radiation to modulate the microstructure of the glass and to increase the hydrogen gas permeability of the glass network. A method of providing hydrogen gas in the shell and exposing the shell to electromagnetic radiation of a wavelength and fluence that increases permeability of the shell to hydrogen gas so that encapsulated hydrogen gas permeates through the shell.

20 Claims, 1 Drawing Sheet

(56) References Cited

U.S. PATENT DOCUMENTS

| | | | |
|---|---|---|---|
| 7,030,050 B2 * | 4/2006 | Dernovsek et al. | 501/139 |
| 7,033,966 B2 * | 4/2006 | Kobayashi et al. | 501/41 |
| 7,169,489 B2 * | 1/2007 | Redmond | 429/515 |
| 7,198,867 B2 * | 4/2007 | Sanders | 429/218.2 |
| 8,052,784 B2 * | 11/2011 | Field | 206/0.7 |
| 2004/0009121 A1 | 1/2004 | Jensen et al. | |
| 2006/0026900 A1 * | 2/2006 | Jang | 429/17 |
| 2006/0030483 A1 * | 2/2006 | Jang | 502/400 |
| 2006/0051638 A1 * | 3/2006 | Gross | 206/0.7 |
| 2006/0063003 A1 * | 3/2006 | Yang et al. | 428/403 |
| 2007/0259220 A1 | 11/2007 | Redmond | |
| 2008/0032879 A1 * | 2/2008 | Tsai et al. | 501/42 |
| 2008/0035200 A1 * | 2/2008 | Chabak | 206/0.7 |
| 2009/0107853 A1 * | 4/2009 | Tan et al. | 206/7 |
| 2010/0219086 A1 * | 9/2010 | Chabak | 206/7 |

OTHER PUBLICATIONS

Penkov et al, "Nucleation kinetics in a glass-ceramic enamel," J. Mat. Sci. 19 (1984), pp. 233-244.*

Ceccato et al, "Nucleation of Ga2O3 nanocrystals in the K2O-Ga2O3-SiO2 glass system," J. Appl. Phys. V. 90, No. 5, Sep. 1, 2001, pp. 2522-2527.*

Alieva et al, "Synthesis and Characterization of Potassium Gallate Silicate with the Zeolite L Structure," Inorganic Materials, vol. 38, No. 1, 2002, pp. 69-71.*

Priven, "General method for calculating the properties of oxide glasses and glass forming melts from their composition and temperature," Glass Technol. 2004, 45(6), pp. 244-254.*

Lipinska-Kalita et al, "High-pressure x-ray diffraction studies of the nanostructure transparent vitroceramic medium K2O-SiO2-Ga2O3," Phys. Rev. B 68 (2003) pp. 035209-035209-8.*

Volf, Chemical Approach to Glass: Glass Science and Technology 7, pp. 229-325, Elsevier 1984.*

Tsujita, "Gas sorption and permeation of glassy polymers with microvoids," Prog. Polym. Sci. 28 (2003), pp. 1377-1401.*

Ismail et al, "Penetrant-induced plasticization phenomenon in glassy polymers for gas separation membrane," Separation and Purification Technology 27 (2002), pp. 173-194.*

Shelby et al, "A Radically New Method for Hydrogen Storage in Hollow Glass Microspheres," available at http://www.netl.doe.gov/publications/proceedings/06/ucr/presentations/Shelby.DOE%20June%2006.pdf.*

Schultz, "Binary Titania-Silica Glasses Containing 10 to 20 Wt% TiO2," J. of the American Ceramic Society, vol. 59, issue 5-6, pp. 214-219, May 1976 (abstract only).*

Kumar et al, "Hydrogen in Bulk Metallic Glasses; Storage Potential and Effects on Structure," Jun. 7, 2004, available at http://handle.dtic.mil/100.2/ADA425020.*

Glenn D. Rambach, "*Hydrogen Transport and Storage in Engineered Glass Microspheres.*" Prepared for the DOE Hydrogen Program Contractor's Review Meeting, Coral Gables, FL Apr. 18, 1995, Lawrence Livermore National Laboratory.

R.J.Teitel, Robert J. Teitel Associates, "*Microcavity Hydrogen Storage Final Progress Report.*" Prepared for Energy Storage and Conversion Div, Dept of Energy and Environment, Upton, NY; United States Department of Energy (May 1981).

* cited by examiner

HOLLOW GLASS MICROSPHERE CANDIDATES FOR REVERSIBLE HYDROGEN STORAGE, PARTICULARLY FOR VEHICULAR APPLICATIONS

RELATED APPLICATION DATA

This Application claims priority from U.S. Provisional Patent Application No. 61/068,341, filed Mar. 6, 1008.

BACKGROUND OF THE ART

1. Field of the Invention

The present invention relates to the field of hydrogen storage, controlled release of hydrogen that is stored and hydrogen storage method where molecular hydrogen is stored in micro-containers built of glass that is hollow glass microspheres.

The principal of the present invention is to recommend new glass systems and glass compositions and to identify new processes and develop novel techniques allowing for fast and effective hydrogen permeation through the wall of a glass or glass-ceramic microsphere which would permit to eliminate the existing barriers for hydrogen diffusion.

2. Background of the Art

The principle of the fuel cell was discovered by German scientist Christian Friedrich Schönbein in 1838 and published in the January 1839 edition of the "Philosophical Magazine" Based on this work, the first fuel cell was developed by Welsh scientist Sir William Robert Grove in 1843. The fuel cell he made used similar materials to today's phosphoric-acid fuel cell. In 1955, W. Thomas Grubb, a chemist working for the General Electric Company (GE), further modified the original fuel cell design by using a sulfonated polystyrene ion-exchange membrane as the electrolyte. Three years later another GE chemist, Leonard Niedrach, devised a way of depositing platinum onto the membrane, which served as catalyst for the necessary hydrogen oxidation and oxygen reduction reactions. This became known as the 'Grubb-Niedrach fuel cell'. GE went on to develop this technology with NASA and McDonnell Aircraft, leading to its use during Project Gemini. This was the first commercial use of a fuel cell. It wasn't until 1959 that British engineer Francis Thomas Bacon successfully developed a 5 kW stationary fuel cell. In 1959, a team led by Harry Ihrig built a 15 kW fuel cell tractor for Allis-Chalmers which was demonstrated across the US at state fairs. This system used potassium hydroxide as the electrolyte and compressed hydrogen and oxygen as the reactants. Later in 1959, Bacon and his colleagues demonstrated a practical five-kilowatt unit capable of powering a welding machine. In the 1960s, Pratt and Whitney licensed Bacon's U.S. patents for use in the U.S. space program to supply electricity and drinking water (hydrogen and oxygen being readily available from the spacecraft tanks).

UTC's Power subsidiary was the first company to manufacture and commercialize a large, stationary fuel cell system for use as a co-generation power plant in hospitals, universities and large office buildings. UTC Power has marketed this fuel cell as the PureCell 200, a 200 kW system.

Types of Fuel Cells

| Fuel Cell Name | Electrolyte | Qualified Power (W) | Working Temperature (° C.) | Electrical efficiency | Status |
|---|---|---|---|---|---|
| Metal hydride fuel cell | Aqueous alkaline solution (e.g., KOH) | ? | above −20 (50% $P_{peak}$ @ 0° C.) | ? | Commercial/Research |
| Electro-galvanic fuel cell | Aqueous alkaline solution (e.g., potassium hydroxide) | ? | under 40 | ? | Commercial/Research |
| Direct formic acid fuel cell (DFAFC) | Polymer membrane (ionomer) | to 50 W | under 40 | ? | Commercial/Research |
| Zinc-air battery | Aqueous alkaline solution (e.g., potassium hydroxide) | ? | under 40 | ? | Mass production |
| Microbial fuel cell | Polymer membrane or humic acid | ? | under 40 | ? | Research |
| Upflow microbial fuel cell (UMFC) | | ? | under 40 | ? | Research |
| Reversible fuel cell | Polymer membrane (ionomer) | ? | under 50 | ? | Commercial/Research |
| Direct borohydride fuel cell | Aqueous alkaline sol. (e.g., NaOH) | ? | 70 | ? | Commercial |
| Alkaline fuel cell | Aqueous alkaline sol. (e.g., KOH) | 10 kW to 100 kW | under 80 | Cell: 60-70% System: 62% | Commercial/Research |
| Direct methanol fuel cell | Polymer membrane (ionomer) | 100 kW to 1 MW | 90-120 | Cell: 20-30% System: 10-20% | Commercial/Research |
| Reformed methanol fuel cell | Polymer membrane (ionomer) | 5 W to 100 kW | (Reformer)250-300 (PBI)125-200 | Cell: 50-60% System: 25-40% | Commercial/Research |

-continued

| Fuel Cell Name | Electrolyte | Qualified Power (W) | Working Temperature (° C.) | Electrical efficiency | Status |
|---|---|---|---|---|---|
| Direct-ethanol fuel cell | Polymer membrane (ionomer) | up to 140 mW/cm$^2$ | above 25 ? 90-120 | ? | Research |
| Formic acid fuel cell | Polymer membrane (ionomer) | ? | 90-120 | ? | Research |
| Proton exchange membrane fuel cell | Polymer membrane (ionomer) (e.g., Nafion ® or Polybenzimidazol fiber) | 100 W to 500 kW | (Nafion)70-120 (PBI)125-220 | Cell: 50-70% System: 30-50% | Commercial/Research |
| RFC-Redox | Liquid electrolytes with redox shuttle & polymer membrane (Ionomer) | 1 kW to 10 MW | ? | ? | Research |
| Phosphoric acid fuel cell | Molten phosphoric acid ($H_3PO_4$) | up to 10 MW | 150-200 | Cell: 55% System: 40% Co-Gen: 90% | Commercial/Research |
| Molten carbonate fuel cell | Molten alkaline carbonate (e.g., sodium bicarbonate $NaHCO_3$) | 100 MW | 600-650 | Cell: 55% System: 47% | Commercial/Research |
| Tubular solid oxide fuel cell (TSOFC) | $O^{2-}$-conducting ceramic oxide (e.g., zirconium dioxide, $ZrO_2$) | up to 100 MW | 850-1100 | Cell: 60-65% System: 55-60% | Commercial/Research |
| Protonic ceramic fuel cell | $H^+$-conducting ceramic oxide | ? | 700 | ? | Research |
| Direct carbon fuel cell | Several different | ? | 700-850 | Cell: 80% System: 70% | Commercial/Research |
| Planar Solid oxide fuel cell | $O^{2-}$-conducting ceramic oxide (e.g., zirconium dioxide, $ZrO_2$) | up to 100 MW | 700-1000 | Cell: 60-65% System: 55-60% | Commercial/Research |

The efficiency of a fuel cell is dependent on the amount of power drawn from it. Drawing more power means drawing more current, which increases the losses in the fuel cell. As a general rule, the more power (current) drawn, the lower the efficiency. Most losses manifest themselves as a voltage drop in the cell, so the efficiency of a cell is almost proportional to its voltage. For this reason, it is common to show graphs of voltage versus current (so-called polarization curves) for fuel cells. A typical cell running at 0.7 V has an efficiency of about 50%, meaning that 50% of the energy content of the hydrogen is converted into electrical energy; the remaining 50% will be converted into heat. (Depending on the fuel cell system design, some fuel might leave the system unreacted, constituting an additional loss.)

For a hydrogen cell operating at standard conditions with no reactant leaks, the efficiency is equal to the cell voltage divided by 1.48 V, based on the enthalpy, or heating value, of the reaction. For the same cell, the second law efficiency is equal to cell voltage divided by 1.23 V. (This voltage varies with fuel used, and quality and temperature of the cell.) The difference between these number represents the difference between the reaction's enthalpy and Gibbs free energy. This difference always appears as heat, along with any losses in electrical conversion efficiency.

Fuel cells are not constrained by the maximum Carnot cycle efficiency as combustion engines are, because they do not operate with a thermal cycle. At times this is misrepresented by saying that fuel cells are exempt from the laws of thermodynamics, because most people think of thermodynamics in terms of combustion processes (enthalpy of formation). The laws of thermodynamics also hold for chemical processes (Gibb's free energy) like fuel cells, but the maximum theoretical efficiency is higher (83% efficient at 298° K) than the Otto cycle thermal efficiency (60% for compression ratio of 10 and specific heat ratio of 1.4). Of course, comparing limits imposed by thermodynamics is not a good predictor of practically achievable efficiencies. Also, if propulsion is the goal, electrical output of the fuel cell has to still be converted into mechanical power with the corresponding inefficiency. In reference to the exemption claim, the correct claim is that the "limitations imposed by the second law of thermodynamics on the operation of fuel cells are much less severe than the limitations imposed on conventional energy conversion systems". Consequently, they can have very high efficiencies in converting chemical energy to electrical energy, especially when they are operated at low power density, and using pure hydrogen and oxygen as reactants.

For a fuel cell operated on air (rather than bottled oxygen), losses due to the air supply system must also be taken into account. This refers to the pressurization of the air and adding moisture to it. This reduces the efficiency significantly and brings it near to the efficiency of a compression ignition engine. Furthermore fuel cells have lower efficiencies at higher loads.

The tank-to-wheel efficiency of a fuel cell vehicle is about 45% at low loads and shows average values of about 36% when a driving cycle like the NEDC (New European Driving Cycle) is used as test procedure. The comparable NEDC value for a Diesel vehicle is 22%. It is also important to take losses due to production, transportation, and storage into account. Fuel cell vehicles running on compressed hydrogen may have a power-plant-to-wheel efficiency of 22% if the hydrogen is stored as high-pressure gas, and 17% if it is stored as liquid hydrogen.

Fuel cells cannot store energy like a battery, but in some applications, such as stand-alone power plants based on discontinuous sources such as solar or wind power, they are combined with electrolyzers and storage systems to form an energy storage system. The overall efficiency (electricity to hydrogen and back to electricity) of such plants (known as round-trip efficiency) is between 30 and 50%, depending on conditions. While a much cheaper lead-acid battery might return about 90%, the electrolyzer/fuel cell system can store indefinite quantities of hydrogen, and is therefore better suited for long-term storage.

Solid-oxide fuel cells produce exothermic heat from the recombination of the oxygen and hydrogen. The ceramic can run as hot as 800 degrees Celsius. This heat can be captured and used to heat water in a micro combined heat and power (m-CHP) application. When the heat is captured, total efficiency can reach 80-90%. CHP units are being developed today for the European home market.

Fuel cells are very useful as power sources in remote locations, such as spacecraft, remote weather stations, large parks, rural locations, and in certain military applications. A fuel cell system running on hydrogen can be compact, lightweight and has no major moving parts. Because fuel cells have no moving parts and do not involve combustion, in ideal conditions they can achieve up to 99.9999% reliability. This equates to less than one minute of down time in a six year period.

A new application is micro combined heat and power, which is cogeneration for family homes, office buildings and factories. This type of system generates constant electric power (selling excess power back to the grid when it is not consumed), and at the same time produces hot air and water from the waste heat. A lower fuel-to-electricity conversion efficiency is tolerated (typically 15-20%), because most of the energy not converted into electricity is utilized as heat. Some heat is lost with the exhaust gas just as in a normal furnace, so the combined heat and power efficiency is still lower than 100%, typically around 80%. In terms of energy however, the process is inefficient, and one could do better by maximizing the electricity generated and then using the electricity to drive a heat pump. Phosphoric-acid fuel cells (PAFC) comprise the largest segment of existing CHP products worldwide and can provide combined efficiencies close to 90% (35-50% electric+remainder as thermal) Molten-carbonate fuel cells have also been installed in these applications, and solid-oxide fuel cell prototypes exist.

However, since electrolyzer systems do not store fuel in themselves, but rather rely on external storage units, they can be successfully applied in large-scale energy storage, rural areas being one example. In this application, batteries would have to be largely oversized to meet the storage demand, but fuel cells only need a larger storage unit (typically cheaper than an electrochemical device).

Conceptually, hollow glass microspheres are the most promising alternative to gas tank technology, providing the potential to store high density of molecular hydrogen, the freedom of shape for their container, low production costs as well as an inherently safe manner to store gaseous hydrogen on board of a vehicle. The most important problem concerning the practical application of glass microspheres as microcontainers for hydrogen is linked to the slow rates of hydrogen permeation trough the walls of a glass sphere. Currently, to extract hydrogen, the glass spheres must be heated to high temperatures since at room temperature the gas extraction process is sluggish. Finding suitable glass compositions and development of techniques for optimization of hydrogen permeability in glass will permit to eliminate current barriers for practical application of the glass micro-containers for storage of gaseous hydrogen on board of a vehicle.

Published U.S. Patent Application No. 20070259220 describes that there are a variety of hydrogen storing materials that may be heated to release hydrogen. Three exemplary hydrogen storing materials that are suitable for use with the present invention include among others metal hydrides, carbon nanostructures (e.g., nanotubes, fullerenes, etc.), and glass microspheres. Conventional forms of each of these hydrogen storage materials are known in the arts. Metal hydrides contain hydrogen that has been reacted with and chemically bound by metals. In simplified concept the metal hydride "soaks up" hydrogen into the metal alloy the way a sponge soaks up water, although the hydrogen is chemically bound and may be recovered by heating rather than by squeezing. Many metal hydrides contain hydrogen bonded thereto under high-pressure conditions that may be released by heating at lower pressure. Carbon nanotubes are tubes of carbon on the order of several nanometers in diameter that may adsorb and store hydrogen on their surfaces and within their tubular structure. Carbon nanotubes have a high hydrogen storage capacity per unit weight. Glass microspheres are hollow glass spheres that can be used to store hydrogen. The microspheres may be heated to increase the permeability of their walls to hydrogen and filled or charged with hydrogen in a high pressure hydrogen environment. Thereafter the microspheres may be cooled to lock the hydrogen inside. Recovery of hydrogen from the microspheres may be achieved by a subsequent heating to again increase the permeability of the sphere walls to hydrogen and allow it to be recovered from the interior void. In some embodiments of the invention, the hydrogen storing material may comprise sodium alanate (sodium aluminum hydride or $NaAlH_4$), or a doped sodium alanate. Hydrogen may be recovered from various doped sodium alanate materials by heating to temperatures not greater than about 150° C. Doped sodium alanates for hydrogen storage are disclosed in related U.S. Patent Application Publication No. 20040009121 filed on Jun. 16, 2003 (Craig M. Jensen and Scott D. Redmond) entitled "Improved Methods For Hydrogen Storage Using Doped Alanate Compositions", which is hereby entirely incorporated by reference. As discussed therein, one suitable dopant is $\{n_5C_5H_5\}_2TiH_2$. Hydrogen may be recovered from this material by heating to a temperature not greater than approximately 100° C. Many alternate dopants are also disclosed including related dopants wherein the cyclopentadienyl ring structure is modified or substituted, and those wherein the titanium is replaced by another catalyst such as zinc or another transition element. In an exemplary embodiment the ratios of NaH:aluminum:titanium are approximately 0.7:1.0:0.1 or else the molar ratio of NaH is in the range of approximately 0.1 to 0.88, the molar ratio of dopant is in the range of approximately 0.04 to 0.3, and approximately 3 moles of sodium are removed from the material for each approximately 1 mole of dopant added to the material. In alternate embodiments of the invention, the hydrogen storing material may comprise a solid alkali metal alanate as disclosed in U.S. Pat. No. 6,106,801 by Bogdanovic. In one embodiments of the invention, the hydrogen storing material may include rare earth hydrides, or many other materials that are known. In any event, the hydrogen storage material may be inserted into the cassette, charged with hydrogen under pressure, and the cassette may be sealed for distribution and subsequent hydrogen recovery.

U.S. Pat. No. 5,840,440 (Ovshinsky) discloses a broad range of glass compositions that can be used to store hydrogen for fuel cells. Rather than encapsulation of the hydrogen, hydrogen storage material that is characterized by a density of hydrogen storage sites of greater than $1.2 \times 10^{23}$/cc and more preferably greater than $1.5 \times 10^{23}$/cc, corresponding to a specific capacity which is far in excess of conventional hydrogen storage materials. The material can be used as an electrochemical electrode, a gas phase storage alloy or a fuel cell.

A hydrogen accumulation in hollow 5-200 μm glass microspheres with 0.5-5 μm walls is described by S. P. Malyshenko and O. V. Nazarova. (see a paper titled: "Hydrogen Accumulation" published in Nuclear and hydrogen energetics and technology (in Russian), issue 8, pp 155-205, 1988). When under pressure at 200° C.-400° C., hydrogen diffuses intensely through the walls, fills in the microspheres and remains there under pressure after cooling. When heating the microspheres to the above temperatures at external hydrogen pressure of 500 atm, hydrogen weight content (wt. %) in the microspheres reaches 5.5%-6.0%. The hydrogen weight content can be even lower, if the external hydrogen pressure is lower. On heating to 200° C., about 55% of hydrogen contained in microspheres will be released. Accordingly, about 75% of hydrogen contained in microspheres will be released on heating to 250° C. At hydrogen storage in glass microspheres, its wall diffusion losses are about 0.5% per 24 hours. In the case when the microspheres are coated with metal films, diffusion losses of hydrogen at room temperatures can be 10 to 100 times lower. The main drawback of this method is in the fact that the microspheric accumulator cannot be charged at very high hydrogen pressures and high temperatures, because it makes the process hazardous due to the low tensile strength of glass, which is within 20 kg/mm$^2$. This does not allow hydrogen weight content in the microspheres to be substantially higher than 6% (by weight).

SUMMARY OF THE PRESENT INVENTION

Hydrogen gas is stored in glass and glass-ceramic microbubbles or microcapsules having permeability to hydrogen gas that can be altered by irradiation with at least one wavelength or a range of wavelengths of electromagnetic radiation. With a sufficiently low permeability before irradiation (e.g., less than 1% of $H_2$ loss per day of storage, and approximately less than 50% loss in 30 days), the microcapsules can store the hydrogen during transportation and carriage by the system with a fuel cell, and the hydrogen can be released from the microcapsules on demand by local irradiation.

The present invention relates to fuel cell technology. In particular, the invention relates to systems for improving fuel cell system efficiency.

A fuel cell electrochemically combines hydrogen and oxygen to produce electrical energy. The ambient air readily supplies oxygen. Hydrogen provision, however, calls for a working supply. Gaseous hydrogen has a low energy density that reduces its practicality as a portable fuel. Liquid hydrogen, which has a suitable energy density, must be stored at extremely low temperatures and high pressures, making storing and transporting liquid hydrogen burdensome.

A reformed hydrogen supply processes a fuel source to produce hydrogen. The fuel source acts as a hydrogen carrier. Currently available hydrocarbon fuel sources include methanol, ethanol, gasoline, propane and natural gas. Liquid hydrocarbon fuel sources offer high energy densities and the ability to be readily stored and transported. A fuel processor reforms the hydrocarbon fuel source to produce hydrogen.

Fuel cell evolution so far has concentrated on large-scale applications such as industrial size generators for electrical power back-up. Consumer electronics devices and other portable electrical power applications currently rely on lithium ion and similar battery technologies. Fuel cell systems that generate electrical energy for portable applications such as electronics would be desirable but are not yet commercially available. In addition, techniques that increase fuel cell system efficiency would be beneficial.

Microspheres are solid or hollow particles of size between 1 to 1000 micrometers. Hollow particles can have wall thickness from hundreds of microns to under 0.025 micron. Microspheres can be perfectly spherical, but are more often found as slightly ovoid or egg shaped, and can be appropriately described as being equiaxial in geometry. Microsphere materials are normally found as dry powders that have a strong density dependence on sphere outer and inner diameter. The true density of a hollow microsphere is lower than that of solid materials of the same composition. The density of hollow microspheres ranges from 95% to less than 1% of the parent bulk material density (as low as 0.025 g/cc or less). The spherical morphological shape is one of the unique features that differentiate these materials from others. A sphere has the lowest specific unit surface area of any geometric form and has a high realizable packing density. In bulk form, microspheres can behave in fluid like manner, deforming semi-elastically without resistance to applied stresses and can roll past one another like ball bearings, with no rough surfaces or branches to entangle. When dispersed as slurry or paint, at common loadings, they act to extend the volume and enhance drying and adhesion properties of the dispersion medium, with minimal impact on its original viscosity. Materials design engineers and others skilled in the art often use microspheres to increase the solid content of coating solutions while having the ability to maintain appropriate coating application and flow characteristics. Higher solids loadings in various applications can reduce volatile organic compound concentrations (VOCs), shrinkage, and drying time in paints. The large volume that microspheres displace for a given weight is an important attribute in many applications. Because hollow spheres will tend to lower the density of materials they are added to paint or coating formulations. A low-density coating or paint formulation will atomize better, give less spatter when rolling, and sag less once applied and since a small weight-addition of microspheres increases the batch volume significantly, formulation cost can be reduced.

Since microspheres are closed-cell, gas-filled or hollow particles, they are extremely good insulators. Thermal and acoustic insulation properties of coatings or substrates can be improved by the addition of microspheres. Heat-insulation properties of the ceramic microspheres are directly related to their thermal conductivity and radiation. The role of radiation increases with increase in temperature and becomes prominent effect in thermal insulation above about 700° C. The thermal conductivity of the hollow spheres depends on the shell material and the low conducting gas inside the spheres. In general, the lower the thermal conductivities of the wall material and the internal gas (or vacuum), the lower the effective shell thermal conductivity. Heat insulation properties are also defined by special features of emissivity and scattering of thermal radiation by thin-walled hollow particles. Glass or polymeric hollow spheres used in thermal insulation applications need an overcoating of a high emissivity material to improve the heat-insulation properties.

Microspheres are widely used in the fiber-reinforced polyester industry to improve the manufacturing process of shower stalls and boats. Lighter, more-durable fiberglass products are a direct result of the creative use of microspheres. Thick-film ink, mining explosives, and rubber and plastic products of all descriptions are just a few other examples of the many products that are made better with these versatile materials. The benefits derived by these diverse end uses vary—some are unique to a specific industry, while others are common goals shared by many manufacturers.

Synthesis of ceramic microspheres include soda glass, aluminum silicate, silicon dioxide, aluminum phosphate, calcium phosphate, calcium silicate and titanium oxide etc. [J. Szepvolgy, Z. Karoly, Preparation of Hollow Alumina Microspheres by RF Thermal Plasma, Key Engineering Materials Vols. 264-268, 101-104 (2004); U.S. Pat. No. 6,110,528; J. K. Cochran, Ceramic hollow spheres and their applications, Current Opinion in Solid State & Materials Science, 3, 474-479 (1998)]. The prior art aluminum phosphate microspheres are amorphous and highly porous to be suitable for catalyst supports.

Hollow ceramic spheres can be prepared by several processing methods. Melting of the components in flame and foam using foaming agents like sulfur leads to very large spheres 70-100 microns. Silica hollow spheres can be formed using polymer spheres as templates and high temperature annealing leads to hollow spheres after burning out organic polymers. Titanium oxide microspheres are formed by interface-assembly synthesis. (Nakashima T, Kimizuka N. J Am Chem Soc. 2003 May 28; 125(21):6386-7). Metallic spheres (for example, syntactic foams) are also known in prior art. Recently spray drying method is being utilized in making ceramic microspheres [E. Sizgek, J. R. Bartlett, and M. P. Brungs, Production of Titanate Microspheres by Sol-Gel and Spray-Drying, Journal of Sol-Gel Science and Technology, Vol. 13, pp. 1011-1016 (1998); P. Luo and T. G. Nieh, preparation hydroxyapatite powders with controlled morphology, Biomaterials, Vol. 17, pp. 1959-1964, (1996)]. Glass microspheres possess alkali metals which diffuse during processing and in field. So need additional protection layers to prevent the alkali metal leaching. These ions are also detrimental to the electrical properties of glass. Presence of boron in the precursor solution affects the stability of solutions resulting in sol formation or precipitation before undergoing heat treatment to form microspheres.

The principal of the present invention is to recommend new glass systems and glass compositions and to identify new processes and develop novel techniques allowing for fast and effective hydrogen permeation through the wall of a glass or glass-ceramic microsphere which would permit to eliminate the existing barriers for hydrogen diffusion.

Suitable glass compositions are described that will: (i) exhibit satisfactory permeability of gaseous hydrogen, (ii) be able to create glass networks with functional 'gates' generated upon external stimuli and (iii) be capable of trapping and releasing gaseous hydrogen 'on-demand' at conditions close to ambient, what is the requirement for all practical applications of glass spheres.

Finally, we disclose that hydrogen can be stored and distributed using hollow glass microspheres made of specific compositions with efficiencies greater than that of other currently proposed methods-materials-compounds etc.

DETAILED DESCRIPTION OF THE INVENTION

Figure 1:
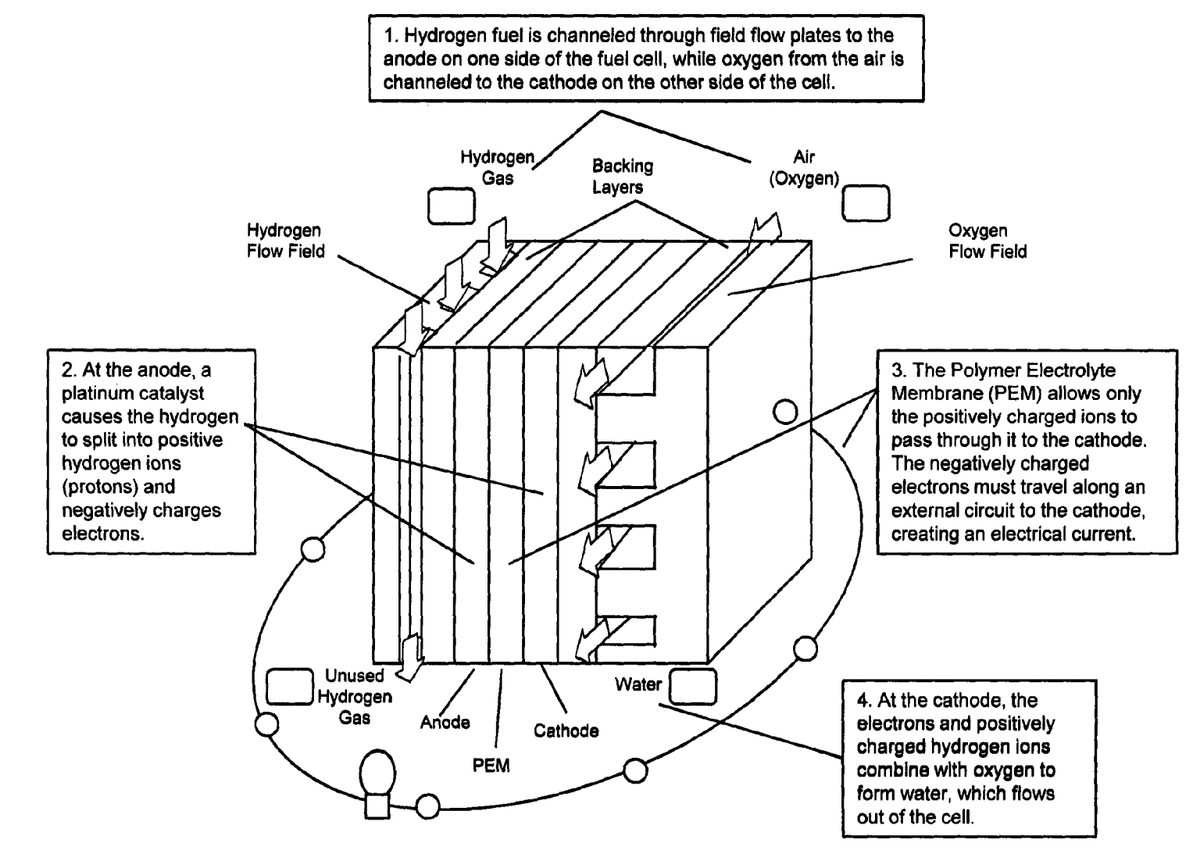
FIG. 1 shows a schematic of a fuel cell.

A fuel cell is an electrochemical energy conversion device. It produces electricity from various external quantities of fuel (on the anode side) and oxidant (on the cathode side). These react in the presence of an electrolyte. Generally, the reactants flow in and reaction products flow out while the electrolyte remains in the cell. Fuel cells can operate virtually continuously as long as the necessary flows are maintained.

Fuel cells are different from batteries in that they consume the reactant, which must be replenished, while batteries store electrical energy chemically in a closed system. Additionally, while the electrodes within a battery react and change as a battery is charged or discharged, a fuel cell's electrodes are catalytic and relatively stable.

Many combinations of fuel and oxidant are possible. A hydrogen cell uses hydrogen as fuel and oxygen as oxidant. Other fuels include hydrocarbons and alcohols. Other oxidants include air, chlorine and chlorine dioxide.

In essence, a fuel cell works by catalysis, separating the component electrons and protons of the reactant fuel, and forcing the electrons to travel through a circuit, hence converting them to electrical power. The catalyst is typically comprised of a platinum group metal or alloy. Another catalytic process takes the electrons back in, combining them with the protons and the oxidant to form waste products (typically simple compounds like water and carbon dioxide).

In the archetypal hydrogen-oxygen proton exchange membrane fuel cell (PEMFC) design, a proton-conducting polymer membrane, (the electrolyte), separates the anode and cathode sides. This was called a "solid polymer electrolyte fuel cell" (SPEFC) in the early 1970s, before the proton exchange mechanism was well-understood. (Notice that "polymer electrolyte membrane" and "proton exchange membrane" result in the same acronym.)

On the anode side, hydrogen diffuses to the anode catalyst where it later dissociates into protons and electrons. The protons are conducted through the membrane to the cathode, but the electrons are forced to travel in an external circuit (supplying power) because the membrane is electrically insulating. On the cathode catalyst, oxygen molecules react with the electrons (which have traveled through the external circuit) and protons to form water—in this example, the only waste product, either liquid or vapor.

In addition to this pure hydrogen type, there are hydrocarbon fuels for fuel cells, including diesel, methanol (e.g., direct-methanol fuel cells) and chemical hydrides. The waste products with these types of fuel are carbon dioxide and water.

Construction of a low temperature PEMFC: Bipolar plate as electrode with in-milled gas channel structure, fabricated from conductive plastics (enhanced with carbon nanotubes for more conductivity); Porous carbon papers; reactive layer, usually on the polymer membrane applied; polymer membrane. Condensation of water is produced by a PEMFC on the air channel wall. The gold wire around the cell ensures the collection of electric current. The materials used in fuel cells differ by type. The electrode-bipolar plates are usually made of metal, nickel or carbon nanotubes, and are coated with a catalyst (like platinum, nano iron powders or palladium) for higher efficiency. Carbon paper separates them from the electrolyte. The electrolyte could be ceramic or a membrane.

A typical PEM fuel cell produces a voltage from 0.6 V to 0.7 V at full rated load. Voltage decreases as current increases, due to several factors: Activation loss; Ohmic loss (voltage drop due to resistance of the cell components and interconnects); and Mass transport loss (depletion of reactants at catalyst sites under high loads, causing rapid loss of voltage)

To deliver the desired amount of energy, the fuel cells can be combined in series and parallel circuits, where series yield higher voltage, and parallel allows a stronger current to be drawn. Such a design is called a "fuel cell stack." Further, the cell surface area can be increased, to allow stronger current from each cell.

The proposed methodology is based on well-known photoinduced phenomena taking place in glasses and extensively utilized in telecommunication industry for functionalizing optical fibers, refractive index structuring, waveguide manufacturing, inscription of Bragg fiber and planar waveguide gratings or wavelength-divided multiplexing, signal shaping, fiber lasers, and amplifiers, etc. It is documented that exposing pure silica or doped silica based glasses to laser light of specific wavelengths may induce a variety of processes that can yield a range of temporary or permanent changes in the macroscopic physical properties of a glass including modification of the refractive index—an important phenomenon from the point of view of practical applications. To amplify some of the photoinduced processes, hydrogen treatment called hydrogen loading, has been practically used as a post-treatment for the photosensitization of the glass fibers. It is essential to underline that, in contrast to many spectacular advances in applications of photoinduced effects in the telecommunications industry, the fundamental understanding of the relevant photoinduced processes in glasses is incomplete and the details of the reactions and mechanisms involved have remained still obscure.

The present technology includes both compositions of matter, materials, apparatus and methods. One composition would include a source of hydrogen comprising a glass or glass ceramic shell and a gas fill therein comprising at least 80% by volume of hydrogen. The glass shell has an initial permeability to hydrogen gas of less than about 50% decrease in pressure in 30 days and a final permeability to hydrogen resulting in about 50% decrease in pressure in a time scale of minutes, and preferably in less than 60 seconds, upon exposure of the shell to a fluence of at least 0.1 W/cm$^2$ to at least 10 W/cm$^2$ (depending on whether IR, VIS or UV sources are used, the former requiring relatively higher fluence) of electromagnetic radiation to modulate the glass density and to increase the hydrogen gas permeability of the glass network.

These hydrogen-filled shells would be used in a method of providing hydrogen gas. This method would include encapsulating hydrogen gas in a microcapsule having a glass or glass-ceramics shell (as described herein.) The user or system would then expose the glass shell to electromagnetic radiation of a wavelength and fluence that increases permeability of the shell to hydrogen gas so that encapsulated hydrogen gas permeates through the shell. This method of increasing the permeability of the glass shell may direct the hydrogen gas that permeates through the shell so that it can be used as fuel for a fuel cell.

By exposing the proposed glass composition to laser or other irradiation in the range expanding in VIS-UV-IR (visible, ultraviolet and infrared), the photoinduced reactions and permanent as well as temporary changes in the macroscopic physical properties of the glass will be investigated, including compaction and structural relaxation of stress built into the glass network. It is expected that the permeability will go from negligible (on a time scale of minutes, since pressure inside the microspheres decreases by 50% in 30 days) to a $H_2$ flow rate which will lead to release of $H_2$ in a time scale on the order of seconds.

We intend to take benefit from the light—induced photochemical reactions in silica based differently doped glasses that in recent years have been widely utilized for functionalizing the optical fibers. In particular, we propose to use exposure of a glass (glass systems, glass compositions and glass-ceramics are specified below) to light sources of selected wavelengths such as conventional UV light sources, as well as UV and VIS lasers and finally high-energy, near IR lasers, all operating in continuous or pulsed regime, in order to induce 'on demand' density modulations of a glass network. We anticipate that the proposed procedures will cause alteration of bonds within the glass matrix, resulting in a lower glass network connectivity and thus higher ability of atomic displacements. Finally, we assume that these procedures will allow us to generate compaction or expansion of the glass network that subsequently could be reversed after applying either elevated temperatures, additional radiation of a different wavelength or the mere absence of radiation may cause a reversed process. We postulate that the described processes will permit us to control the diffusion of molecular hydrogen (gas) in bulk glasses as well as hydrogen permeability of the wall of a hollow glass microsphere, which is the principal goal of the proposed invention.

A. Glass Systems and Glass Compositions Proposed for Fabrication of Hollow Glass and Glass-Ceramic Microspheres.

Following our idea of improving glass matrix thermal conductivity, thermal expansion, hydrogen permeability as well as affinity of certain glass components to hydrogen, we propose the following glass systems and glass compositions for the fabrication of bulk glasses, thin glass films and at last hollow glass microspheres that exhibit superior physico-chemical and thermo-mechanical performance and will permit to eliminate current barriers for practical application of the glass microspheres as micro-containers for storage of gaseous hydrogen on board a vehicle.

Disclosed herein is fabrication of glass and glass-ceramic hollow microspheres (HGMS), preferably using the following binary, tertiary and quaternary glass systems. The selected compositions are based on differently doped, silica-derived glasses (as the "matrix glass component," although other inorganic oxide glass or ceramic forming materials may be used as the matrix glass component). We will start from: (i) exploring glasses of proposed compositions in the form of bulk glass material, (ii) next we will fabricate thin glass films and finally (iii) we will produce glass microspheres—future candidates for vehicular storage of gaseous hydrogen.

It is crucial to underline here that, silica based glasses are in the lead as one of the best performing types of amorphous materials for current multiple technological applications, and it is one of the reasons they have been selected. The combinations of relative ease of preparation, flexibility in their composition, excellent mechanical strength are their essential characteristics.

1. $SiO_2$—($GeO_2$) Glass Systems for HGMS

We disclose $SiO_2$— based binary glasses, composed of $SiO_2$ glass doped by $GeO_2$ (also co-doped by Ga, Al, Cu, Ag, Pt, Fe, As, Sn, Sb, Se, Pb, Bi, Ti, and In equivalent oxides may be used). The main glass forming component $SiO_2$ will be differently doped by $GeO_2$. The doping level will start from few wt % (e.g., 0.5%, 2%, 4%, 5%, 8%, 10%, etc.) with the total level of $GeO_2$ (or more or other oxides and combinations thereof) doping not exceeding 50 wt %. Although the main description will refer primarily to materials based on $SiO_2$ and mixture of $SiO_2$ and $GeO_2$, the disclosure is not limited thereto and includes the alternative oxides described above.

This binary composition is an important system for fiber optics and $SiO_2$ glasses doped with few wt % of $GeO_2$ are currently broadly used for manufacturing optical fibers with extremely low losses for optical communications. $SiO_2$—($GeO_2$) glasses are typically built of a continuous three-dimensional random network consisting of interconnected $SiO_4$ and $GeO_4$ tetrahedra and have better thermal properties such as conductivity and network expansion than pure silica glass.

Our previous works involving synthesis and microstructural characterization of mixed $SiO_2$—$GeO_2$ glasses proved excellent compositional flexibility of these compositions due to isostructural substitution of Ge in place of Si as well as demonstrated good homogenity and optical quality of fabricated glasses.

2. $SiO_2$—($TiO_2$) Glass Systems for HGMS

Also disclosed are $SiO_2$—based binary glasses, composed of $SiO_2$ glass doped by $TiO_2$. The main glass forming component $SiO_2$ will be differently doped by $TiO_2$. The doping level will start from a few wt % of $TiO_2$—.

The different $TiO_2$ doping levels have not been optimized, but again may be in the range of at least 0.5% to 50%. More precisely we believe utility can be found in homogeneous glasses, with low level of $TiO_2$ doping (below few wt %), and phase-separated glasses, with higher doping level. Finally, by mixing of $TiO_2$ and $SiO_2$ components that can transform material from the amorphous state into crystalline we plan to fabricate nanostructured composites. These glass-derived, double phased materials with $TiO_2$ nanocrystals uniformly dispersed within a network of the amorphous host matrix are potentially promising candidates for HGMS.

Mixed $SiO_2$—($TiO_2$) glass systems are commonly used in optical thin film filters and wave-guiding layers functioning in the visible and near-infrared wavelength ranges. A large range of intermediate refractive index values can be obtained in these glasses by suitable mixing of the components. Studies indicated that the forms, amorphous or crystalline, depend on the Ti content as well as could be tailored by appropriate thermal annealing.

3. ($SiO_2$—$GeO_2$)—($TiO_2$) Glass Systems for HGMS

Also disclosed herein are ($SiO_2$—$GeO_2$)—$TiO_2$ ternary glass systems, differently doped by $TiO_2$, where the $SiO_2$ component is partially substituted by an isostructural component that is $GeO_2$. The isomorphic substitution of $SiO_2$ by $GeO_2$ will range from close to 0% up to 50%, and overall $TiO_2$ doping will not exceed 30%.

$TiO_2$-doped $SiO_2$ glasses are known from low thermal expansion over a wide temperature range, which offers dimensional stability in variety of applications such as elements of optical instruments in which they are used. Proposed $GeO_2$-doping of $SiO_2$-derived glass, combined with co-doping by Ti will modify the overall glass network structure and the macroscopic parameters. Furthermore, it will increase the glass refractive index and it is expected to modify the glass thermal conductivity. It is known that thermal properties (such as expansion and conductivity) of $GeO_2$ glass are superior to that of $SiO_2$ glass. Thus, we postulate that the magnitude of the mentioned thermal parameters could be fine tuned by the amount of $SiO_2$ and $GeO_2$ isomorphic substitutions as well as $TiO_2$ co-doping.

Our preceding studies of $SiO_2$—$GeO_2$ glass systems proved excellent mixing of these two components and mutual, isostructural substitution of Si and Ge atoms.

4. $SiO_2$—$Ga_2O_3$—$K_2O$ Glass Systems and Glass-Derived Nanocrystalline Composites for HGMS Also disclosed are $SiO_2$—$Ga_2O_3$—($K_2O$) (or CaO, MgO, $Na_2O$ or $Li_2O$, and the like) ternary glass systems, where the main glass forming component $SiO_2$ is doped by $Ga_2O_3$ and co-doped by $K_2O$ (or CaO, MgO, $Na_2O$ or $Li_2O$, and the like). The projected level of $Ga_2O_3$ doping will not exceed 50% and $K_2O$ co-doping will be between 0.1 and 10%. Glasses of these compositions as well as nanocrystalline composites derived from these glass compositions are among the generic classes or materials used in the present technology.

It was recently proposed that polycrystalline semiconducting gallium oxide thin films represent a promising material for gas sensor devices to detect molecular hydrogen and can act as catalysts in de- or hydrogenation of various organic compounds.

Our extensive studies of glasses and glass-derived nanocrystalline composites belonging to $SiO_2$—$Ga_2O_3$—$K_2O$ systems, including pure and doped materials by different optically active ions, revealed that these systems could form bulk glasses of very good optical quality. Additionally, these glasses are very attractive for many other practical applications such as active optical devices. Previous studies showed that they can be transformed into transparent nanocrystalline materials and therefore belonging to a family of glass-ceramics. In fact, in preceding investigations we demonstrated controlled nucleation and growth processes of single phase $Ga_2O_3$ nanocrystals homogeneously dispersed within an optically transparent $SiO_2$—$Ga_2O_3$-$K_2O$ host glass matrix.

All references cited herein are incorporated by reference in their entirety.

Although specific compositions, concentration, temperatures and times are used in this description, those specific examples and ranges are meant to be exemplary of the generic concepts of the present technology and are not intended to limit the scope of the invention claimed and disclosed unless specifically used in claims appended hereto.

The invention claimed is:

1. A source of hydrogen comprising: a glass or nanocrystalline glass-ceramic shell comprising a network of shell material and a hydrogen gas within said glass or nanocrystalline glass-ceramic shell, the hydrogen gas within the shell comprising at least 80% by volume of hydrogen, wherein the glass or nanocrystalline glass-ceramic shell has an initial permeability through the shell to hydrogen gas of less than 50% decrease in pressure in 30 days and a final permeability through the shell to hydrogen gas of about 50% decrease in pressure in 60 seconds or less by permeation through the shell upon exposure of the glass shell or nanocrystalline glass-ceramic shell to a continuous or pulsed fluence of at least 0.1 $W/cm^2$ of electromagnetic radiation that directly modulates the microstructure of the glass network of the shell material or of the nanocrystalline glass-ceramic shell material to increase the hydrogen gas permeability of the glass shell or nanocrystalline glass-ceramic shell.

2. A method of providing hydrogen gas comprising:
encapsulating hydrogen gas in a microcapsule having a glass or glass-ceramics shell that has a first permeability to hydrogen gas, the hydrogen gas within the shell comprising at least 80% by volume of hydrogen; and
exposing the glass shell or glass-ceramic shell to electromagnetic radiation of a energy, fluence of radiation that directly modulates microstructure of the shell and increases permeability of the shell to hydrogen gas to a rate of permeability higher than the first permeability so that encapsulated hydrogen gas permeates through the shell.

3. The method of claim 2 wherein the hydrogen gas that permeates through the shell is used to fuel a fuel cell.

4. The method of claim 3 wherein the glass comprises a silica glass and at least one additional inorganic oxide molecule and the modulation of the microstructure of the glass or glass-ceramic is permanent.

5. The method of claim 3 wherein the glass or nanocrystalline glass-ceramic comprises a silica glass and at least one additional inorganic oxide comprising titania and the fluence of radiation consists essentially of infrared radiation.

6. The method of claim 3 wherein the glass comprises a silica glass material or nanocrystalline glass-ceramic material and at least two additional inorganic oxides selected from the group consisting of $Ga_2O_3$ and $K_2O$, and the modulation of the microstructure of the glass or nanocrystalline glass-ceramic is permanent.

7. The method of claim 2 wherein the source of radiation is selected from the group of if visible, ultraviolet and infrared radiation in either a continuous or a pulsed radiation emission mode; and the modulation of the microstructure of the glass or nanocrystalline glass-ceramic is permanent.

8. The method of claim 2 wherein the glass comprises a silica glass and at least one additional inorganic oxide molecule and the fluence of radiation consists essentially of infrared radiation.

9. The method of claim 2 wherein the glass or nanocrystalline glass-ceramic comprises a silica glass and at least one additional inorganic oxide comprising titania.

10. The method of claim 2 wherein the glass or nanocrystalline glass-ceramic comprises silica with at least two additional inorganic oxides comprising selected from the group consisting of $Ga_2O_3$ and $K_2O$.

11. The method of claim 2 wherein the hydrogen gas that permeates through the shell is used to fuel a fuel cell and the modulation of the microstructure of the glass shell or nanocrystalline glass-ceramic shell is permanent.

12. A method of providing hydrogen gas comprising: encapsulating hydrogen gas in a microcapsule having a glass or nanocrystalline glass-ceramics shell having a glass matrix that has a first permeability to hydrogen gas, wherein the hydrogen gas within the shell comprises at least 80% by volume of hydrogen;
first exposing the glass shell or nanocrystalline glass-ceramic shell to electromagnetic radiation of an energy, fluence as either continuous or pulsed radiation to induce a photochemical reaction that causes the alteration of chemical bonds in the glass matrix, resulting in a lower glass network connectivity and thus higher ability for atomic displacements, increasing permeability of the glass or nanocrystalline glass-ceramic shell to hydrogen gas to a rate of permeability higher than the first permeability of the shell; and allowing hydrogen gas to permeate into and out of the shell.

13. The method of claim 12 wherein altering bonds in the glass matrix causes a lower glass network connectivity to increase hydrogen gas permeability through the shell and the modulation of the microstructure of the glass or nano crystalline glass-ceramic is temporary or permanent.

14. The method of claim 12 wherein after allowing hydrogen gas to permeate through and out of the shell, the shell is exposed to at least one treatment in addition to exposing the glass shell or nanocrystalline glass-ceramic shell to electromagnetic radiation, the treatment selected from the group consisting of electromagnetic radiation of different energy from the first exposing and elevated temperature, or both combined, to reduce permeability to hydrogen gas.

15. The method of claim 14 wherein the glass or nanocrystalline glass-ceramic comprises a silica glass having at least one additional inorganic oxide molecule selected from the group consisting of $GeO_2$, $TiO_2$, $Ga_2O_3$ and $K_2O$ or their mixture and the modulation of the microstructure of the glass or glass-ceramic is permanent.

16. The method of claim 15 wherein the shell consists of a glass shell or nanocrystalline glass-ceramic shell and the fluence of radiation consists essentially of infrared radiation.

17. The method of claim 14 wherein the shell consists of a glass shell or ceramic shell and the fluence of radiation consists essentially of infrared radiation.

18. The method of claim 12 wherein the source of radiation is selected from the group of lamps or laser light sources of: ultraviolet, near-infrared and visible radiation, operating in either a continuous or a pulsed radiation emission mode.

19. The method of claim 12 wherein the glass comprises a silica glass and at least one additional inorganic oxide molecule selected from the group consisting of $GeO_2$, $TiO_2$, $Ga_2O_3$ and $K_2O$ or mixtures thereof, and the fluence of radiation consists essentially of infrared radiation.

20. The method of claim 12 wherein the shell consists of a glass shell or nanocrystalline glass-ceramic shell and the radiation is selected from the group of l lamps or laser light sources of ultraviolet, near-infrared and visible radiation operating in either a continuous or a pulsed radiation emission mode.

* * * * *